United States Patent [19]
Ruth

[11] 3,847,121

[45] Nov. 12, 1974

[54] ANIMAL FEEDER

[76] Inventor: Arthur P. Ruth, P.O. Box 11037, Houston, Tex. 75016

[22] Filed: July 25, 1973

[21] Appl. No.: 382,286

[52] U.S. Cl. .............................................. 119/51.13
[51] Int. Cl. .......................................... A01k 05/02
[58] Field of Search ........... 119/51.13, 51.14, 51.15, 119/51.11, 51.12, 56 R, 56 A; 221/90

[56] References Cited
UNITED STATES PATENTS

| | | | |
|---|---|---|---|
| 857,037 | 6/1907 | Davison | 221/90 X |
| 2,585,371 | 2/1952 | Coffing | 119/51.13 X |

*Primary Examiner*—Hugh R. Chamblee

[57] ABSTRACT

An animal feeder which incorporates a container divided into several compartments which are stacked vertically, each compartment being separated from the other compartments by means of a horizontal door at the bottom, each door being swung on an axis which enables the door to drop open, thereby dispensing animal feed on a timed basis. A timer mechanism is incorporated which includes a motor driving a lead screw parallel to the container, a traveling nut on the lead screw, and individual latch mechanisms for each door, the traveling nut tripping each latch mechanism.

10 Claims, 3 Drawing Figures

PATENTED NOV 12 1974 3,847,121

ANIMAL FEEDER

BACKGROUND OF THE INVENTION

It is often necessary to feed animals at timed intervals. This invention is directed to an apparatus which dispenses animal feed on a timed basis. It is adapted to be stationed in the vicinity of animals requiring feed on a timed basis when people are unable to disburse the food. The present invention is directed to an animal feeder which is uniquely arranged in a number of compartments within a container which are located vertically. The vertical arrangement enables the feed to be dropped at the same point on each operation of the device. This is advantageous in that the food may be dropped at a specified location such as a trough or dish.

SUMMARY OF THE INVENTION

The present invention includes a container which is divided into a number of compartments by stacked doors, all of which pivot around an individual axis. The axis or shaft on which each door is mounted has a projecting portion which extends beyond the end wall of the container and which is bent sideways. This forms a catch mechanism which is engaged by a latch mechanism for each door. The latch mechanism pivots and has an extending arm or cam means. The arm or cam is positioned adjacent to a lead screw which is supported on a pair of upstanding brackets and driven by a motor having a gear ratio causing a traveling nut to traverse the lead screw at a specified rate to engage each cam means at the designated timed interval, releasing the latch mechanism from the catch and opening the doors. The doors open from the bottom up and dump the animal feed at the right interval to dispense the feed.

DESCRIPTION OF THE PREFERRED EMBODIMENT

Figure 1:
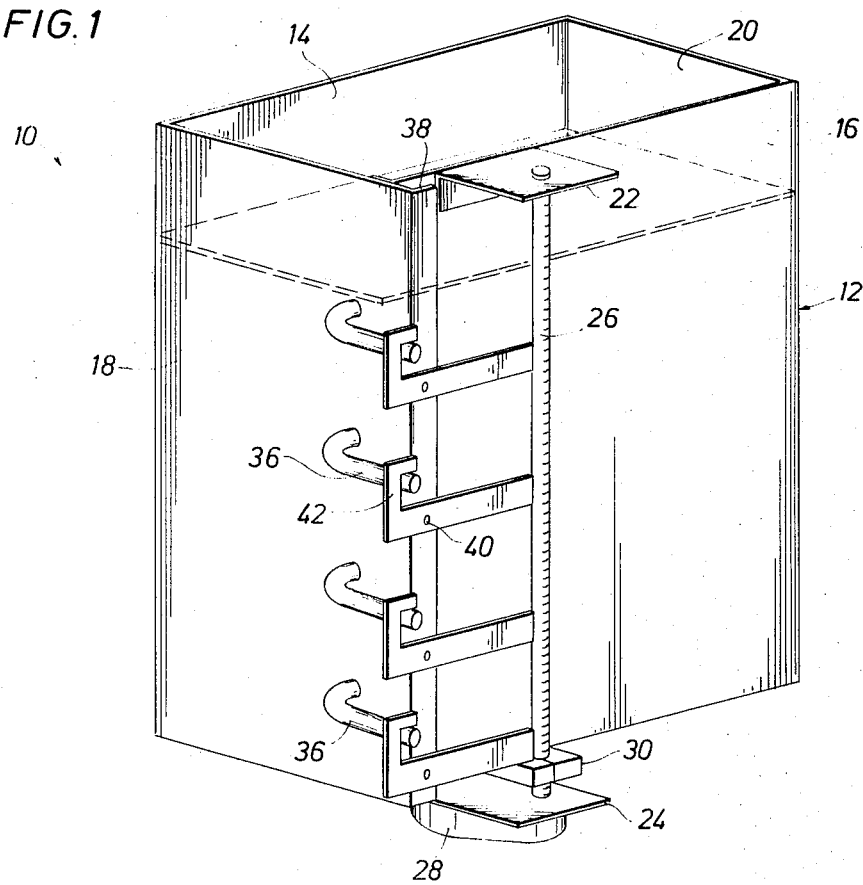
FIG. 1 is an isometric view of the animal feeder of the present invention illustrating the catch and latch mechanisms and timer means causing it to operate in timed sequence.

Attention is directed to FIG. 1 where the numeral 10 identifies the animal feeder of the present invention. It is comprised of a large container 12 which is generally rectangular in shape and has two side walls 14 and 16, and spaced end walls 18 and 20. The container 12 is open at the bottom which is selectively closed by a door as will be described. The side wall 16 has a pair of upstanding brackets 22 and 24 which support a lead screw 26. The lead screw is driven by a motor 28 which operates with a suitable reducer gear mechanism to rotate the lead screw at a specified rate. The lead screw is parallel to side wall 16 and a traveling nut 30 is received on the lead screw 26.

The traveling nut 30 is either square or rectangular and is positioned sufficiently close to the side wall 16 so it does not rotate with the shaft 26. It is not free to rotate fully with the shaft 26, but is maintained in a generally parallel relationship to the side wall 16 so the lead screw is prevented from rotating, causing it to traverse the lead screw.

Figure 2:
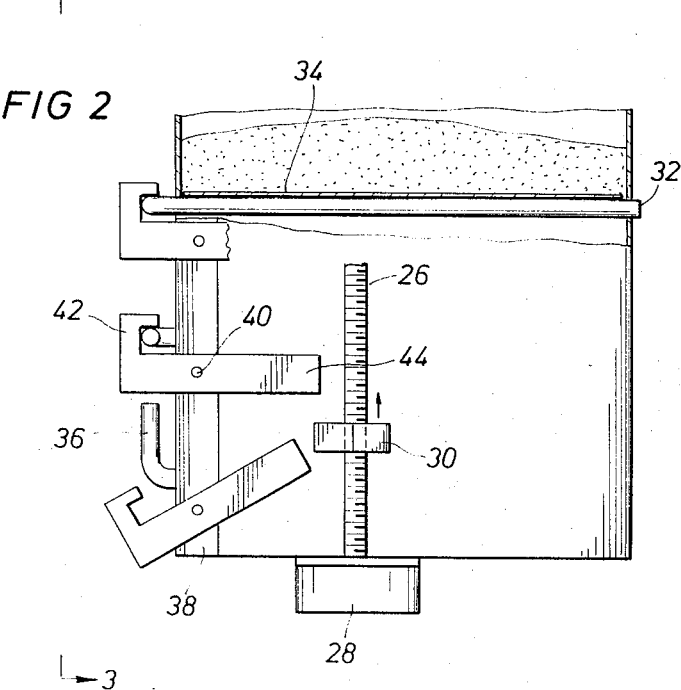
FIG. 2 is a side view of one side illustrating details of construction of the catch and latch mechanisms, a portion of the side wall being broken away to show internal details of construction; and, FIG. 3 is a sectional view along the line 3 — 3 of FIG. 2 showing the timer mechanism and with a portion broken away, one means of mounting a door on a shaft for rotation to an open position.

In FIG. 2, a shaft 32 extends from the end wall 18 to end wall 20. Holes are drilled in the end walls to receive the shaft 32. The shaft 32 supports along its length a door 34 which is welded or otherwise attached to the shaft. The door 34 preferably covers the entire cross section of the container 12. It preferably fits snugly but not so snug as to bind in movement. The door 34 is welded to the shaft 32 so that the two rotate together as a unit. The shaft 32 extends through both end walls. At one end, it is bent and has an L-shaped projecting catch 36 which extends to the side and slightly beyond the end wall 16. This is better shown in FIG. 3. The end wall 18 extends slightly beyond the side wall 20 to define the supportive flange 38. The flange 38 extends parallel to the lead screw 26.

The container 18 is divided into a number of compartments. The shaft 32 and door 34 are duplicated at multiple locations, preferably uniformly vertically spaced, to define a number of compartments of similar capacity for receiving animal feed. The several compartments are defined vertically along the apparatus and are stacked one on the other so that intermediate compartments are defined or limited by the door above and below.

In FIG. 2, the supportive flange 38 is drilled and receives a rivet 40 which serves as a pivot for a latch mechanism. The latch mechanism is shown in FIG. 2 to be generally L-shaped, and has a portion 42 which extends out and over the adjacent catch which is part of the rod stock used in fabrication of the shaft 32. The latch mechanism 42 has a projecting cam portion 44 which extends to the right of the flange. Upward movement of the cam 44 results in downward movement of the latch mechanism 42. The cam 44 extends sufficiently to the right to be in the path of the traveling nut 30. As the nut 30 moves upwardly, it strikes the cam from the nether side and forces it to rotate about the pivot 40. As it rotates, the latch means 42 which reaches over the catch 36 turns downwardly, opening on the upper side, and releasing the catch 36. The catch 36 is caused to rotate. An examination of FIG. 3 better shows how this operates.

Figure 3:
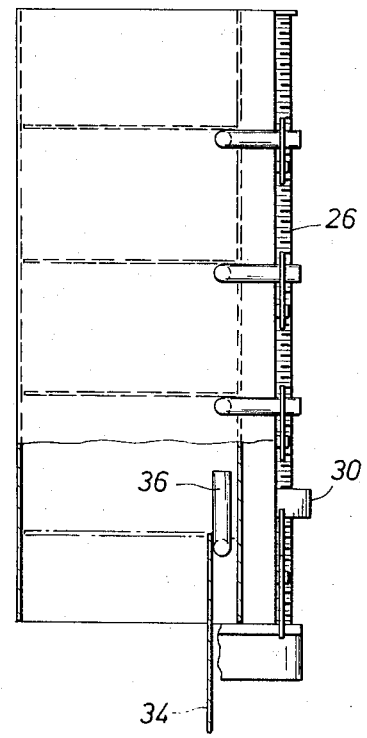

In FIG. 3, the bottom door has been opened. The door 34 is shown moving in a counterclockwise direction on rotation about the shaft 32. In FIG. 2, a catch mechanism rotates from a generally horizontal posture to a generally vertical position. The weight of feed on the door causes it to rotate. The shaft 32 is at the edge of the door.

In operation, the traveling nut 30 is located at the bottom of the shaft. Beginning with all the doors in the latched position, and with animal feed supported on each door, the motor 28 is actuated and the nut 30 begins to move along the lead screw 26. As it moves upwardly as shown in FIG. 2, the nut strikes the cam 44. The nut 30 pushes upwardly on the cam 44, rotating the cam in the upward direction and rotating the latch means 42 downwardly. The latch disengages the catch 36. The weight of the feed on the door 34 forces the door downwardly, thereby dropping the feed. This occurs at a timed interval depending on the pitch of the lead screw 26 and the speed of the motor 28. After the bottom door dumps the feed supported on it, it hangs in the open position of FIG. 3. The traveling nut moves up the lead screw. As the nut moves up, the lead screw advances it to the vicinity of the next cam 34. The process of emptying the next compartment is repeated indefinitely until all compartments have been dumped and the traveling nut is at the upper end.

The apparatus is refilled by returning the travling nut 30 to the bottom position. This can be accomplished rapidly by using a split nut where the two halves are rejoined. The two halves are separated slightly to disengage the threads of the screw and it can be moved rapidly to the bottom without operation of the motor 28. The bottom door is then closed and the catch 36 engaged with the hatch. The other doors are rotated in a clockwise direction until they are approximately vertical, or past the closed position in an up position. The other doors have their catches 36 generally pointed downwardly at this point. The bottom latch holds the bottom door closed while feed is dropped on it from above. In FIG. 2, if the catch 36 tends to move upwardly, the latch may give some with it but it holds all the more surely because it projects over the catch 36. When the bottom compartment is filled, the door above it is latched and the next compartment filled. This process is completed until all of the compartments are filled. The top compartment can be covered as desired with a removable cover if the equipment is to be installed out of doors, or it may be left open as illustrated.

The latch mechanism shown in FIG. 2 is advantageous in that an increase of weight on the door causes it to hold more surely.

The foregoing is directed to the preferred embodiment of the present invention. Many alterations and variations can be incorporated without departing from the scope of the present invention which is determined by the claims appended hereto.

I claim:

1. An animal feed dispenser comprising
a container;
a door in said container having a generally horizontal closed position and an open position, said door defining a feed storage chamber thereabove;
catch means attached to and movable with said door;
a shaft for rotatably mounting said door;
a lead screw;
a travelling nut engaged with said lead screw;
a motor means for rotating said lead screw to advance said nut;
a latch means for latching and releasably holding said catch means to selectively close said door; and,
said latch means being constructed and arranged to form an opening means which receives said catch means, which opening means reaches over said catch means in a manner to hold it against gravity and further including a portion which extends into the path of movement of said travelling nut, and including a pivotal mounting means for said latch means.

2. The apparatus of claim 1 wherein said shaft extends beyond said door and includes a protruding arm which pivots with said shaft.

3. The apparatus of claim 2 wherein said door is between two spaced walls comprising said container and said arm is exteriorly located.

4. The apparatus of claim 3 including a multiplicity of doors and shafts in said container arranged vertically and said shaft extends along the exterior of said container.

5. The apparatus of claim 4 including mounting brackets supporting said lead screw where said traveling nut engages said latch means.

6. The apparatus of claim 1 including a shaft spanning said container and connected to said door, said door and shaft rotating as a unit between closed and open positions.

7. The apparatus of claim 6 wherein said shaft passes through a wall of said container and is connected to said catch means.

8. The apparatus of claim 6 wherein said shaft is bent at one end to form said catch means, and said latch means abuts said catch means on a side determined by the direction in which said catch means moves on release of said latch means.

9. The apparatus of claim 6 including a pivot means supporting said latch means, and said latch means includes a portion reaching over said catch means.

10. The apparatus of claim 9 including a latch means having an opening defined by a pair of spaced side members.

* * * * *